US008657928B2

(12) United States Patent
Moredock et al.

(10) Patent No.: US 8,657,928 B2
(45) Date of Patent: Feb. 25, 2014

(54) VERSATILE COMPACT AIR PRECLEANER, AIR CLEANING METHOD AND DISPOSABLE AIR FILTER CARTRIDGE FOR AIR PRECLEANER

(75) Inventors: James G. Moredock, Jacksonville, FL (US); Eric L. Ehrenberg, Jacksonville, FL (US)

(73) Assignee: The Sy-Klone Company, Jacksonville, FL (US)

( * ) Notice: Subject to any disclaimer, the term of this patent is extended or adjusted under 35 U.S.C. 154(b) by 0 days.

(21) Appl. No.: 13/247,356

(22) Filed: Sep. 28, 2011

(65) Prior Publication Data
US 2013/0025454 A1    Jan. 31, 2013

Related U.S. Application Data

(60) Provisional application No. 61/513,201, filed on Jul. 29, 2011.

(51) Int. Cl.
*B01D 45/00* (2006.01)
(52) U.S. Cl.
USPC ............. 95/268; 95/271; 95/273; 55/385.3; 55/394; 55/337; 55/401; 55/413; 55/414; 55/416; 55/407; 55/406; 55/423; 55/437; 55/438; 55/457; 55/467; 55/502; 55/503; 55/396
(58) Field of Classification Search
USPC ........ 55/394, 396, 401, 437, 438, 457, 385.3, 55/337, 413–414, 416, 407, 406, 423, 467, 55/502, 503; 95/268, 271, 273
See application file for complete search history.

(56) References Cited

U.S. PATENT DOCUMENTS

| 1,746,218 A | 2/1930 | Kamrath |
| 1,756,909 A | 4/1930 | Cram |
| 2,378,506 A | 6/1945 | Sebok |
| 2,506,298 A | 5/1950 | Griffen |

(Continued)

FOREIGN PATENT DOCUMENTS

| DE | 10-2004-035 688 | 3/2005 |
| FR | 1069071 | 7/1954 |

OTHER PUBLICATIONS

International Preliminary Examination Report mailed Aug. 13, 2010, in International Application No. PCT/US08/011095; International Filing Date: Sep. 25, 2008, 11 pages.

(Continued)

*Primary Examiner* — Dung H Bui
(74) *Attorney, Agent, or Firm* — Antonelli, Terry, Stout & Kraus, LLP.

(57) ABSTRACT

A versatile compact air precleaner, air cleaning method and disposable air filter cartridge for air precleaner for separating heavier-than-air particulate debris from debris laden air to provide a clean airflow, wherein a flow path for air passing through a separator chamber of the air precleaner is retroflexed en route to the outlet. A plurality of independently rotatably adjustable housing sections of a housing provide utility with multiple clean air outlet configurations, freedom of direction of ejection of particulate debris from the ejector ports, different inlet configurations, mounting of the precleaner from different sides, accommodation of different sizes of filters, and different clean airflow rate capabilities. A separator chamber end section including the ejector ports is connected to the filter as a removable, disposable air filter cartridge to obviate ejector port clogging with change of filters.

2 Claims, 10 Drawing Sheets

(56) References Cited

U.S. PATENT DOCUMENTS

| | | | |
|---|---|---|---|
| 2,895,296 | A | 7/1959 | Hryniszak |
| 3,258,895 | A | 7/1966 | Wiebe et al. |
| 3,362,155 | A | 1/1968 | Driscoll |
| 3,444,672 | A | 5/1969 | Alsobrooks |
| 4,158,449 | A | 6/1979 | Sun et al. |
| 4,314,832 | A | 2/1982 | Fox |
| 4,323,369 | A | 4/1982 | Monson et al. |
| 4,350,509 | A | 9/1982 | Alseth et al. |
| 4,488,889 | A | 12/1984 | McCarroll |
| 4,512,152 | A | 4/1985 | Asaba |
| 4,881,957 | A | 11/1989 | Shofner |
| 4,890,444 | A | 1/1990 | Vander Giessen et al. |
| 5,112,372 | A | 5/1992 | Boeckermann et al. |
| 5,211,846 | A | 5/1993 | Kott et al. |
| 5,591,008 | A | 1/1997 | Wrobel et al. |
| 5,656,050 | A | 8/1997 | Moredock |
| 5,766,315 | A | 6/1998 | Moredock |
| 5,800,581 | A | 9/1998 | Gielink et al. |
| D401,306 | S | 11/1998 | Ward et al. |
| D407,475 | S | 3/1999 | Coulonvaux et al. |
| 6,280,493 | B1 * | 8/2001 | Eubank ............ 55/398 |
| 6,319,304 | B1 | 11/2001 | Moredock |
| 6,338,745 | B1 | 1/2002 | Moredock et al. |
| 6,406,506 | B1 | 6/2002 | Moredock et al. |
| 6,425,943 | B1 | 7/2002 | Moredock |
| D467,654 | S | 12/2002 | Klug et al. |
| 6,569,219 | B1 | 5/2003 | Connor et al. |
| D481,101 | S | 10/2003 | Boehrs et al. |
| 6,878,189 | B2 | 4/2005 | Moredock |
| 6,958,083 | B1 * | 10/2005 | Schmitz et al. ............ 55/337 |
| 7,004,987 | B2 * | 2/2006 | Pikesh et al. ............ 55/347 |
| 7,056,368 | B2 | 6/2006 | Moredock et al. |
| 7,258,727 | B2 | 8/2007 | Greif et al. |
| 7,452,409 | B2 | 11/2008 | Moredock et al. |
| 7,537,631 | B2 | 5/2009 | Scott et al. |
| 7,662,203 | B2 | 2/2010 | Scott et al. |
| D632,770 | S | 2/2011 | Rotter et al. |
| 8,007,565 | B2 | 8/2011 | Moredock |
| 8,292,984 | B2 | 10/2012 | Baseotto et al. |
| 8,394,166 | B2 | 3/2013 | Scott et al. |
| 8,414,675 | B2 | 4/2013 | Iddings et al. |
| 2004/0103785 | A1 | 6/2004 | North |
| 2004/0216611 | A1 | 11/2004 | Moredock |
| 2004/0231515 | A1 | 11/2004 | Moredock et al. |
| 2005/0172587 | A1 | 8/2005 | Moredock et al. |
| 2006/0048761 | A1 | 3/2006 | Ekeroth et al. |
| 2007/0173188 | A1 | 7/2007 | Moredock et al. |
| 2009/0101013 | A1 | 4/2009 | Moredock |
| 2012/0060453 | A1 | 3/2012 | Holzmann et al. |

OTHER PUBLICATIONS

International Search Report and Written Opinion mailed Dec. 10, 2008, in International Application No. PCT/US08/011095; International Filing Date: Sep. 25, 2008, 15 pages.

Supplementary European Search Report, EP 08843150.7 (PCT/US2008/011095), Feb. 23, 2011.

International Search Report/Written Opinion, PCT/US20121045922, Sep. 24, 2012.

International Preliminary Report on Patentability mailed Jun. 27, 2013 in PCT/US2012/045922 with Article 34 Amendment and amended claims in International Application.

* cited by examiner

VERSATILE COMPACT AIR PRECLEANER, AIR CLEANING METHOD AND DISPOSABLE AIR FILTER CARTRIDGE FOR AIR PRECLEANER

RELATED APPLICATION

This application claims priority under 35 U.S.C. §119 of provisional application No. 61/513,201 filed Jul. 29, 2011. The entire disclosure of provisional application No. 61/513,201 is incorporated herein by reference.

TECHNICAL FIELD

The present invention is directed to an improved air precleaner, air cleaning method and disposable air filter cartridge for air precleaner for efficiently removing heavier-than-air particulate debris from debris laden air to provide a clean airflow to a device with which it is used. The air precleaner is versatile and compact for use in limited space applications having different configurations and clean airflow rate performance requirements in total airflow applications such as ventilation systems, as a fixed airflow provider for heat exchangers and heating and air conditioning systems, and with devices having a variable airflow demand, particularly internal combustion engines which exert a variable vacuum in their air intake to be supplied with clean air. The invention according to a preferred embodiment represents an improvement to the air precleaner and method disclosed in commonly owned U.S. patent application Ser. No. 11/877,036 filed Oct. 23, 2007, now U.S. Pat. No. 8,007,565 issued Aug. 30, 2011, the entire disclosure of which is incorporated herein by reference.

BACKGROUND AND SUMMARY

Air precleaners and methods that centrifugally separate heavier-than-air particles from the air to be used in internal combustion engines, ventilation systems, and other apparatus that draw in air laden with debris, are known. These include powered air precleaners which employ a motor-driven fan for drawing debris laden air into the air precleaner as well as air precleaners which rely solely upon a vacuum applied to the precleaner by the device being supplied with clean air, such as an internal combustion engine, for drawing debris laden air into the precleaner. The known air precleaners can include a filter, and/or be used in combination with a device downstream of the clean air outlet of the precleaner having a filter, for removing additional debris from the air. Examples of assignee's prior air precleaners are shown in U.S. Pat. Nos.:

U.S. Pat. No. 5,656,050
U.S. Pat. No. 5,766,315
U.S. Pat. No. 6,319,304
U.S. Pat. No. 6,338,745
U.S. Pat. No. 6,406,506
U.S. Pat. No. 6,425,943
U.S. Pat. No. 6,878,189
U.S. Pat. No. 7,056,368
U.S. Pat. No. 7,452,409.

Drawbacks of the known air precleaners include that they can be too big for limited space applications and they can require custom manufacturing of an individual air precleaner for a particular application due to variations in configuration and performance requirements. This limits the applications of the air precleaners and adversely effects the time and cost for their manufacture. Examples of air precleaner variations between applications which require individual customization include the required direction of ejection of centrifugally separated particulate debris from the precleaner to atmosphere, the orientation of the clean air outlet for providing clean air from the precleaner to the device with which it is used, the size of a filter in the device, the location of the available supporting structure for mounting the air precleaner, and the clean airflow rate required from the precleaner. In the case of powered air precleaners, the life of the motor of the motor-driven fan in the precleaner has been found to be reduced due to debris/dirt buildup on the motor which lowers the cooling thereof. Further, it has been found that the ejection ports for ejecting debris laden air centrifugally separated from the rotating airflow in the air precleaner are subject to being clogged thereby lowering operational efficiency and decreasing filter life.

There is a need for an improved air precleaner and air cleaning method which overcome these drawbacks and limitations of the known air precleaners. More particularly, there is a need for an improved air precleaner that is compact permitting its use in limited space applications, and is versatile for use in applications with different configurations and clean airflow rate requirements thereby obviating the necessity of a complete custom manufacturing of an individual air precleaner for each application and reducing the time and expense of manufacturing. There is a need for a powered air precleaner which can extend the motor life of a motor driven fan therein. There is also a need for an improved air precleaner and air cleaning method which will facilitate restoring the precleaner to its full operating potential in the event the ejector ports of the precleaner have become clogged.

The improved versatile compact air precleaner, air cleaning method and disposable air filter cartridge of the present invention address these needs. The versatile compact air precleaner of the invention for separating heavier-than-air particulate debris from debris laden air to provide a clean airflow in accordance with a disclosed embodiment comprises a flow path extending through the precleaner from an inlet to an outlet, a motor-driven fan with a fan blade to draw particulate debris laden air into the inlet and flow the debris laden air along the flow path, and an airflow management structure positioned along the flow path to rotate debris laden air drawn into an inlet about an axis to form a rotating flow that stratifies the debris laden air with the heaviest particles in the outermost orbits of the rotating flow. A separator chamber in the flow path centrifugally separates and removes particulate debris laden air from the rotating flow. At least one ejector port is provided through which particulate debris laden air is ejected from the rotating flow in the separator chamber. The flow path for air passing through the separator chamber is retroflexed en route to the outlet. The precleaner of the disclosed embodiment is elongated in the direction of the axis with the inlet and the at least one ejector port located at opposite ends and the outlet located intermediate the ends. By retroflexing the flow path in this manner the air precleaner is more compact permitting use in applications with limited space.

Connection of the air precleaner to a supporting structure/device is facilitated by the provision of at least one mount on the precleaner for mounting the precleaner on the support/device. Versatility is improved for using the device in various configurations in that the air precleaner has means for independently adjusting a radial position of each of the outlet, the at least one ejector port and the at least one mount about the axis of the precleaner to configure the precleaner for mounting on the device and connection to the inlet thereof. In the disclosed embodiment, the means for independently adjusting a radial position includes a housing having a plurality of housing sections arranged sequentially along the axis of the air precleaner and means for releasably connecting and adjustably rotating the sections with respect to one another about the axis. The inlet is located on a housing section apart from that of the at least one ejector port and the outlet and is releasably connected to the precleaner. Accordingly, the inlet configuration can be readily changed permitting adaptation of the air precleaner for ingress of air directly from the atmosphere or indirectly from an air supply conduit connected to the inlet. The adjustability afforded by these features allows the use of a single air precleaner in many different applications/configurations and also facilitates, with only minimal changes, the use of different sizes of filters within the air precleaner and changeover of the air precleaner to meet different airflow rate requirements.

The disclosed, preferred embodiment of the air precleaner of the invention comprises a motor-driven fan with a fan blade mounted on an output shaft of a motor. The fan blade is located in the flow path upstream of the separator chamber and draws particulate debris laden air into the inlet and flows the debris laden air along the flow path. The motor-driven fan is supported on a shroud of the airflow management structure. The shroud tapers outwardly with respect to the axis downstream of the fan blade and shields the motor of the motor-driven fan from the incoming air. A plurality of stationary vanes of the airflow management structure rotate the incoming debris laden air about the axis, compressing the volume of debris laden air to increase the air velocity and centrifugal force acting on the airborne particles. The motor of the motor-driven fan beneath the shroud is in the flow path downstream of the separator chamber, which advantageously reduces dirt and debris buildup on the motor for improved cooling and longer motor life.

The air precleaner of the embodiment further comprises an air filter which forms an inner wall of the separator chamber for filtering air from the innermost orbits of the rotating flow. The flow path for air through the separator chamber is retroflexed en route to the outlet after passing through the filter. The filter is tubular, preferably cylindrical and has a longitudinally extending internal passage for flowing filtered air from the separator chamber toward an outlet of the air precleaner.

The separator chamber includes a separator chamber end section which includes the at least one ejector port. The separator chamber end section is connected to one end of the air filter and is, together with the air filter, removably connected with the air precleaner as a disposable air filter cartridge. Thus, the ejection ports are thrown away with the filter at filter change thereby restoring the air precleaner to its full operating potential if the ports have been clogged during the past filter cycle.

An air cleaning method of the present invention comprises drawing heaver-than-air particulate debris laden air into an inlet of an air precleaner, flowing the particulate debris laden air along the flow path in the precleaner, rotating the flow of the debris laden air about an axis in the precleaner to form a stratified rotating flow with the heaviest particles in the outermost orbits of the rotating flow, ejecting particulate debris laden air from the outermost orbits of the stratified rotating flow through at least one ejector port of the precleaner, filtering air from the innermost orbits of the stratified rotating flow through an air filter extending along said axis within the rotating flow, flowing the filtered air along the flow path toward an outlet of the air precleaner, including utilizing a removable, disposable air filter cartridge in the air precleaner wherein the air filter and the at least one ejector port are integral parts of the removable, disposable air filter cartridge. In accordance with the method, the filtered air leaving the air filter is flowed past the motor of the motor driven fan en route to the outlet of the air precleaner.

A disposable air filter cartridge according to the invention for use in an air precleaner as part of a separator chamber wherein particulate debris laden air is centrifugally separated and removed from a rotating flow of debris laden air through at least one ejector port located within a wall of the separator chamber, comprises a tubular air filter for forming an inner wall of the separator chamber in the air precleaner and filtering air from the innermost orbits of a rotating flow of debris laden air in the separator chamber, the tubular air filter having a longitudinally extending internal passage for flowing filtered air from the separator chamber toward an outlet of the air precleaner, a separator chamber end section securely connected to one end of the tubular air filter and extending radially outwardly from the filter for forming a portion of the wall of the separator chamber, at least one ejector port formed in the separator chamber end section for removal of debris laden air from the rotating flow in the separator chamber, and means permitting releasable connection of the air filter cartridge to the air precleaner.

These and other objects, features and advantages of the present invention will become more apparent from the following description of a preferred embodiment in accordance with the invention when taken in connection with the accompanying drawings.

DETAILED DESCRIPTION

Figure 1:
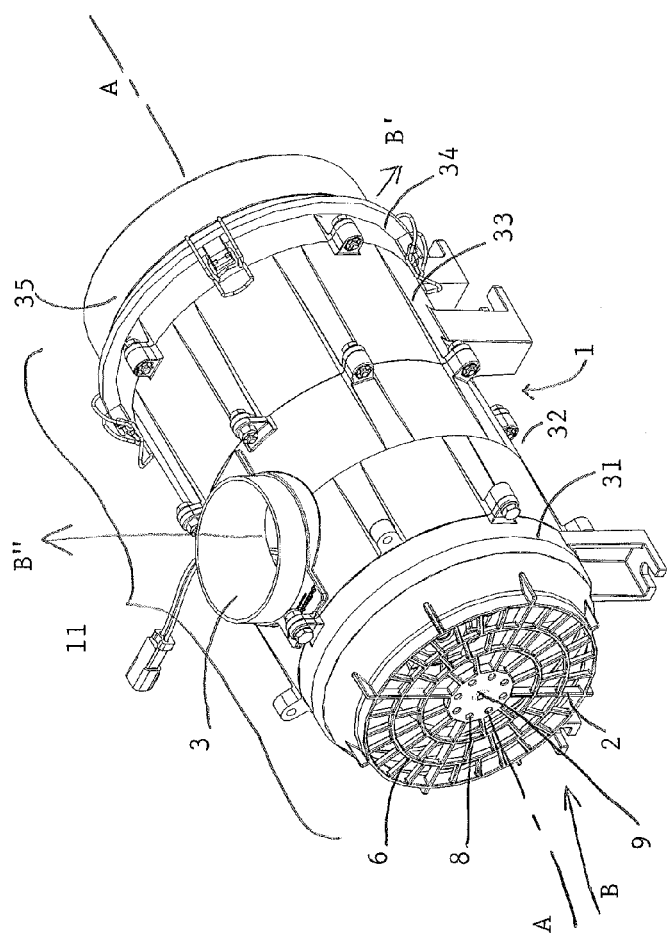
FIG. 1 is a perspective view of an air precleaner of an embodiment of the invention as seen from one side and above.
Figure 6:
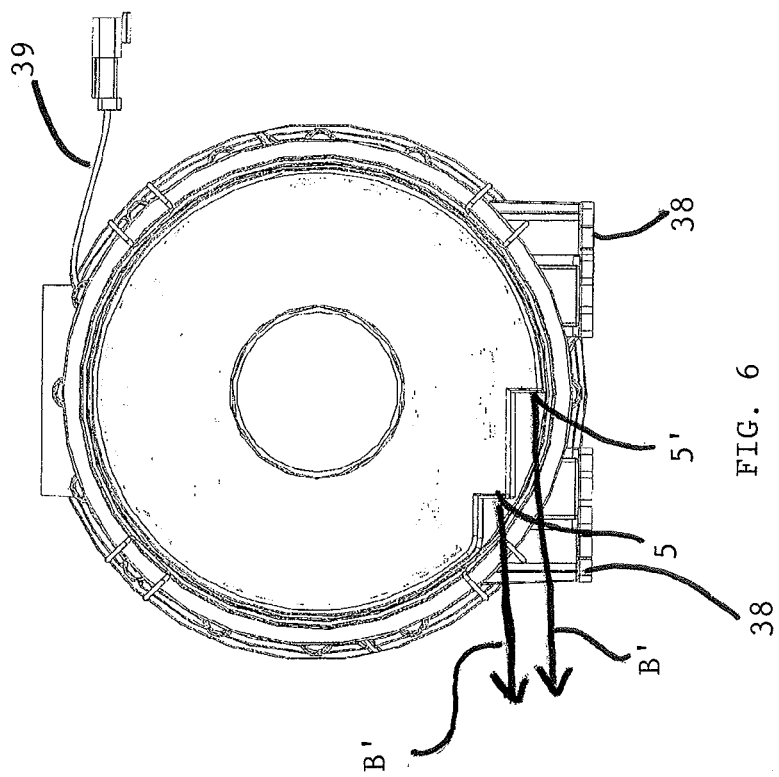
FIG. 6 is a end view of the separator chamber/ejector port end of the air precleaner schematically illustrating with the arrows B, B' the direction of ejection of debris laden air from two ejector ports in the outer wall of the separator chamber at the end of the precleaner.
Figure 12:
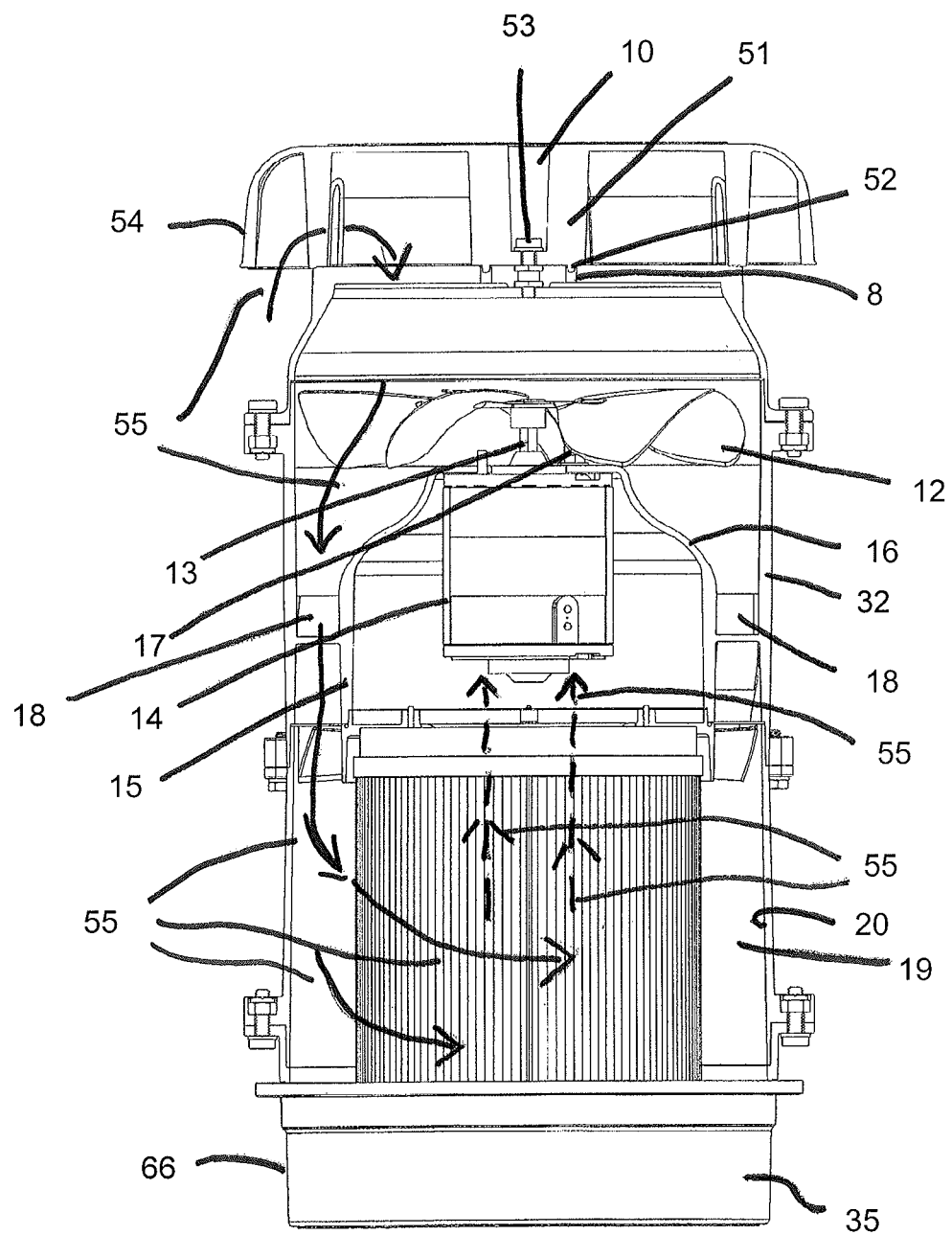
FIG. 12 is a side view of the air precleaner, partially cut away to show the air filter cartridge mounted on the end of the separator chamber with free end of the filter being sealingly positioned against the orifice/coupling member in the precleaner, and the rain cap being shown on the precleaner.

Referring now to the drawings, the powered air precleaner 1 of the disclosed embodiment comprises a flow path shown by the arrows B, B' and B" in FIGS. 1 and 6 and arrows 55 in FIG. 12 extending through the system from an inlet 2 to an outlet 3. A motor-driven fan 4 is located along the flow path to draw particulate debris laden air into the inlet and rotate it about a longitudinal axis A-A of the system to form a rotating flow that stratifies the debris laden air with the heaviest particles in the outermost orbits of the rotating flow. Ejector ports 5 and 5', FIG. 6, are provided in a separator chamber end section 35 of the housing 11 for ejecting particulate debris laden air, B', from the outermost orbits of the stratified rotating flow in the separator chamber 19 of the air precleaner.

Figure 2:
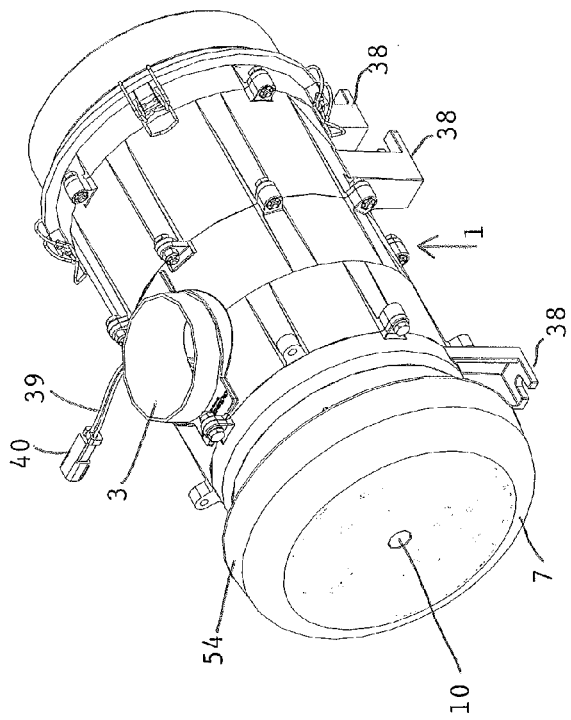
FIG. 2 is a perspective view of the air precleaner of FIG. 1 on which an optional rain cap has been provided above the inlet.

The powered air precleaner 1 of the illustrated embodiment is equipped with an air inlet screen 6 and optionally a rain cap 7, FIG. 2, for an above-the-hood or other outdoor installation on for example a motor vehicle. The underside of the rain cap is designed to aerodynamically direct the airflow in a pattern into the inlet with the least amount of airflow turbulence. The rain cap has a central depending hub, 51, FIG. 12, with four projections 12 thereon press fitted into respective ones of a plurality of holes 8, FIG. 1, spaced concentrically about a threaded opening 9 at the center, on axis A-A, of the open top of the air inlet screen. The rain cap is removably secured to the air inlet screen with a threaded fastener 53, FIG. 12, which extends through a central hole 10 in the hub 51 from the cap and is secured in the threaded opening 9 of the air inlet screen. The screen is integrally molded with an inlet end section 31 of a housing 11 of the air precleaner.

The rain cap 7 is spaced above the air inlet screen 6 by the central depending hub. The diameter of the circular rain cap is larger than that of the air inlet screen and the outer periphery is formed with a depending annular flange 54. The flange extends toward the precleaner, but is spaced radially outwardly therefrom, to a level of the air inlet screen for shielding against rain ingress. The annular open space between the outer circumference of the inlet and the flange permits heavier, slow moving particles to fall out before entering the powered separating system. This reduces debris build up on the screen.

The motor-driven fan 4 has a fan blade 12, FIG. 12, mounted on an output shaft 13 of a motor 14. The fan blade is located below the air inlet screen and along the flow path upstream of an airflow management structure 15 to draw particulate debris laden into the inlet and flow the debris laden air along the flow path as shown schematically by the arrows 55 in FIG. 12. The airflow management structure includes a shroud 16 on which the motor-driven fan is supported. Releasable fasteners 17 such as threaded bolts with nuts connect the motor to the upper central end of the shroud 16, FIG. 12. The shroud tapers outwardly downstream of the fan blade as seen in FIG. 12, leaving an outer annular passage with circumferentially spaced, angled, stationary vanes 18 of the airflow management structure connecting the shroud 16 and housing section 32.

The tapered shroud and angled stationary vanes of the airflow management structure compress and rotate the debris laden air drawn into the inlet by the fan to form a rotating flow about the axis A-A that stratifies the debris laden air with the heaviest particles in the outermost orbits of the rotating flow. The volume of the debris laden air is compressed by the airflow management structure as it moves along the flow path to increase the air velocity and centrifugal force acting on the airborne particles. The motor 14 of the motor-driven fan 4 is located on the opposite side of the shroud from the fan blade and in the flow path of clean air downstream from the separator chamber 19 as depicted in FIG. 12.

The separator chamber 19 of the precleaner is in the flow path downstream of the shroud 16 and vanes 18 to receive the rotating flow and to centrifugally separate and remove from the rotating flow particles of debris in the outermost orbits of the rotating flow. The separator chamber has an outer wall 20, FIG. 12, formed by three housing sections 33, 34, and 35 FIG. 3, of the housing of the air precleaner. The separator chamber end section 35 of the housing closes the lower end of the separator chamber and supports an air filter 23. The two radially outer ejector ports 5, 5' are formed in an outer annular wall portion 66 of the end section 35 which forms a portion of the outer wall of the separator chamber when the end section is secured to the air precleaner by the releasable spring clamps 28 on separator chamber section 34. During operation of the air precleaner, particulate debris laden air from the outermost orbits of the rotating flow in the separator chamber is ejected to the atmosphere through the ejection ports.

Figure 9:
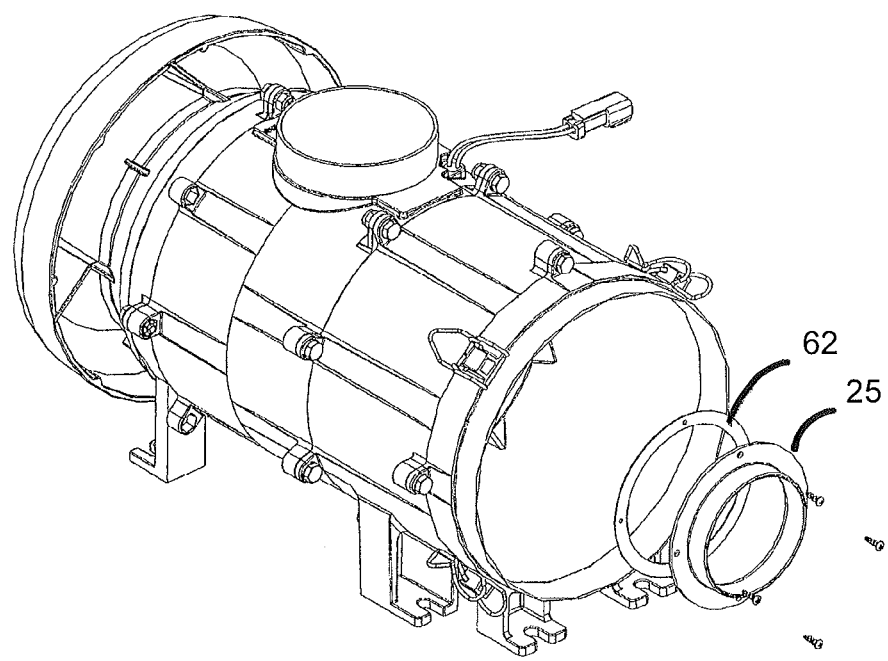
FIG. 9 is a perspective view of the air precleaner of FIG. 2 as seen from one side and above with the air filter cartridge of the precleaner removed and an orifice/coupling member, gasket and metal screws upon which an end of the air filter cartridge is sealed, when installed in the air precleaner, shown in disassembled position.
Figure 10:
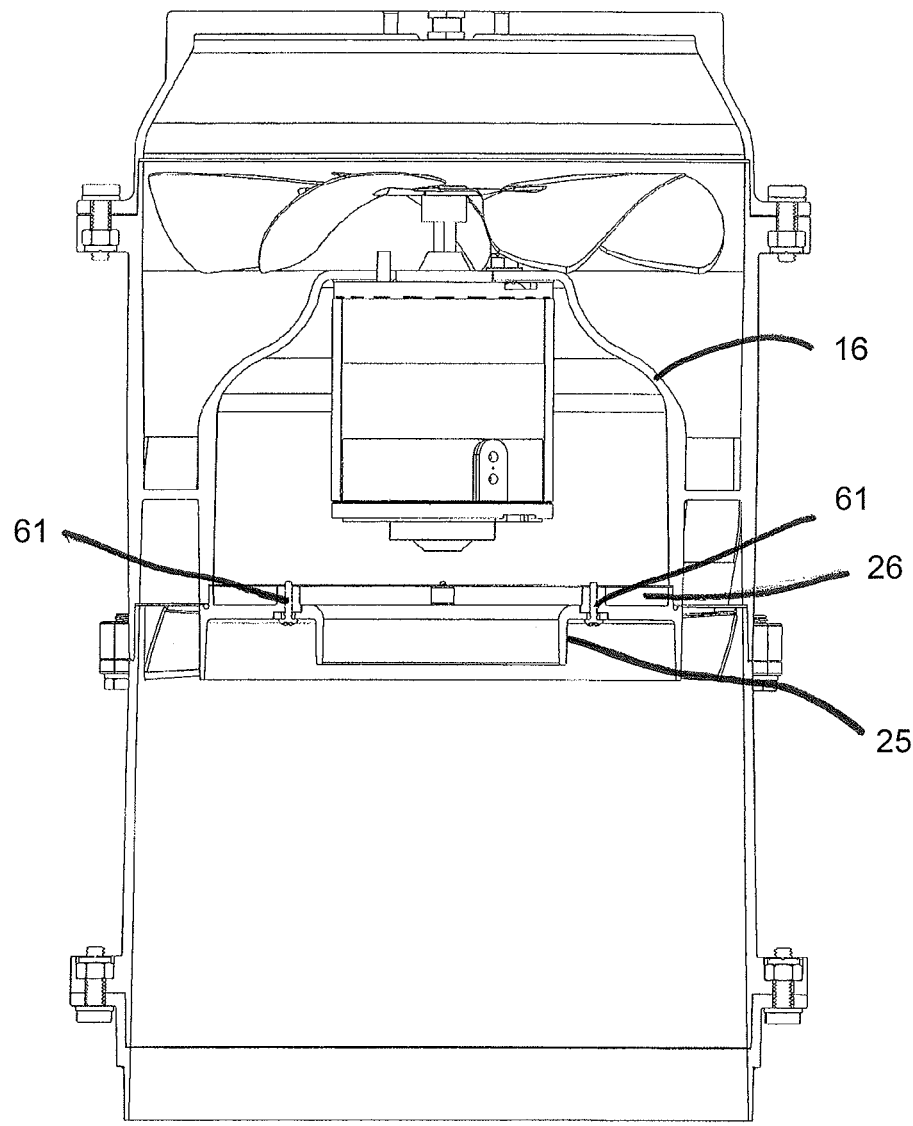
FIG. 10 is a side view of the air precleaner of FIG. 9 without the rain cap and the air filter cartridge, the precleaner having been partially cut away to show the orifice/coupling member mounted in the precleaner for receiving an end of the air filter cartridge is sealing relation thereon.
Figure 11:
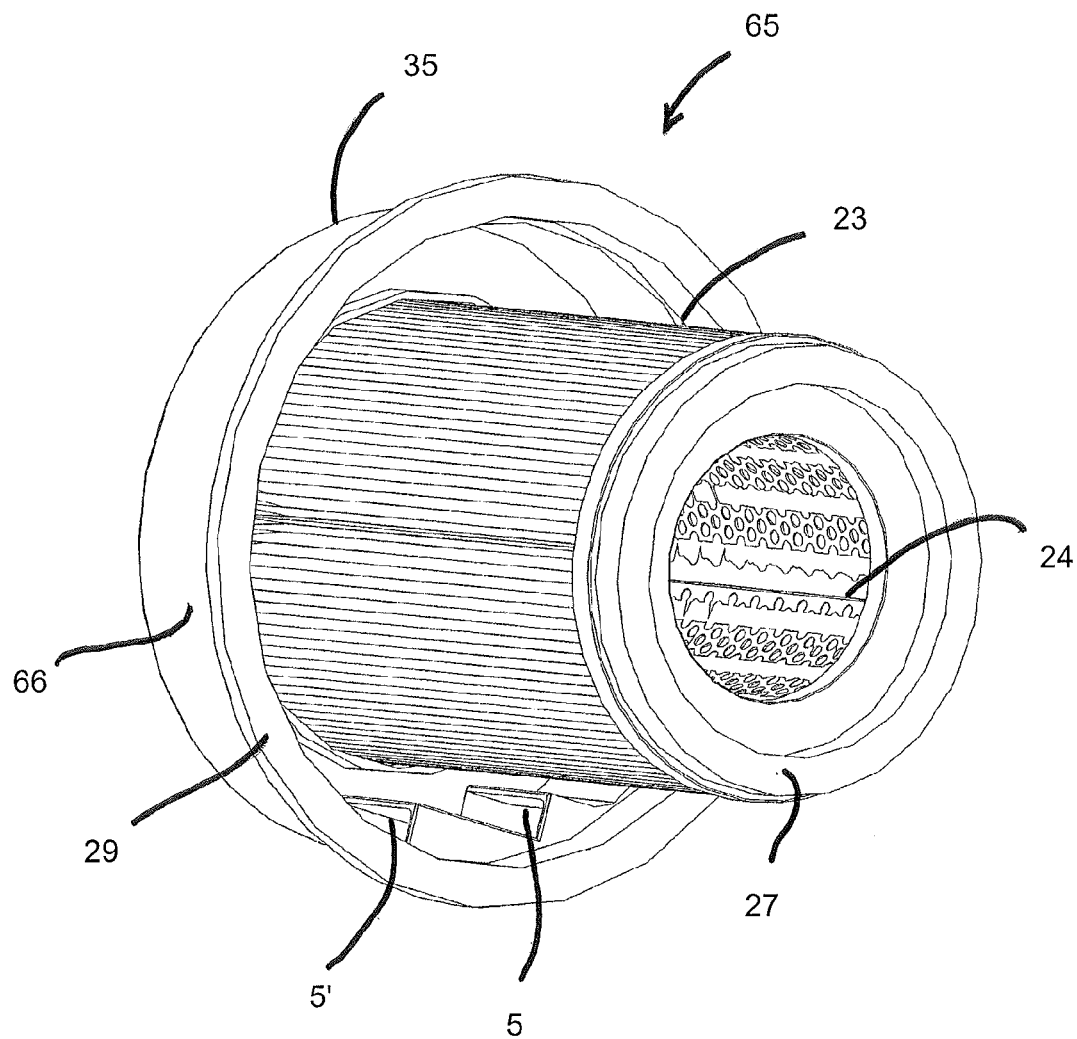
FIG. 11 is a perspective view of the air filter cartridge with integral separation chamber end section/cap with ejector ports therein for removable attachment on the precleaner portion shown in FIG. 10.

The tubular, preferably cylindrical air filter 23 has a longitudinally extending internal passage 24 therethrough. One end of the filter is connected to end section 35. The passage 24 forms a portion of the flow path 55 for filtered air flowing to the outlet from the other, open end of the filter. The filter is sealingly connected at the one end as by an adhesive to the center of the end wall of section 35 which closes the separation chamber and one end of passage 24. The filter is coaxial with the axis A-A when installed in the air precleaner with the filter being located centrally within the separator chamber and forming an inner wall of the separator chamber. The filter extends the full length of the chamber where the other end releasably, sealingly engages a flange of orifice/coupling member 25, FIG. 9. The member 25 is releasably connected to a radially inwardly directed flange 26 connected to the shroud 16 of the airflow management structure by threaded fasteners 61, FIG. 10. A sealing gasket 62, FIG. 9, is provided between the flange 26 and coupling member 25. A flexible annular seal 27, FIG. 11, mounted on the end of the air filter sealingly engages the flange of the orifice/coupling member 25 to ensure that the flow path of air from the innermost orbits of the stratified rotating flow in the separator chamber to the outlet 3 is through, not around, the filter. The filtered air flows through the internal passage 24 which is in open communication with the central orifice in the orifice/coupling member 25 and into an area within the shroud 16 where it flows past the motor 14 of the motor-driven fan 4 and out of the outlet 3 located intermediate the ends of the air precleaner. The lower, outer end of the shroud is sealingly secured on the annular flange 26 for separating the portions of the flow path upstream of the separator chamber from those downstream from the separator chamber. As a result, the flow path for air passing through the filter in the separator chamber to the outlet 3 is retroflexed.

Figure 5:
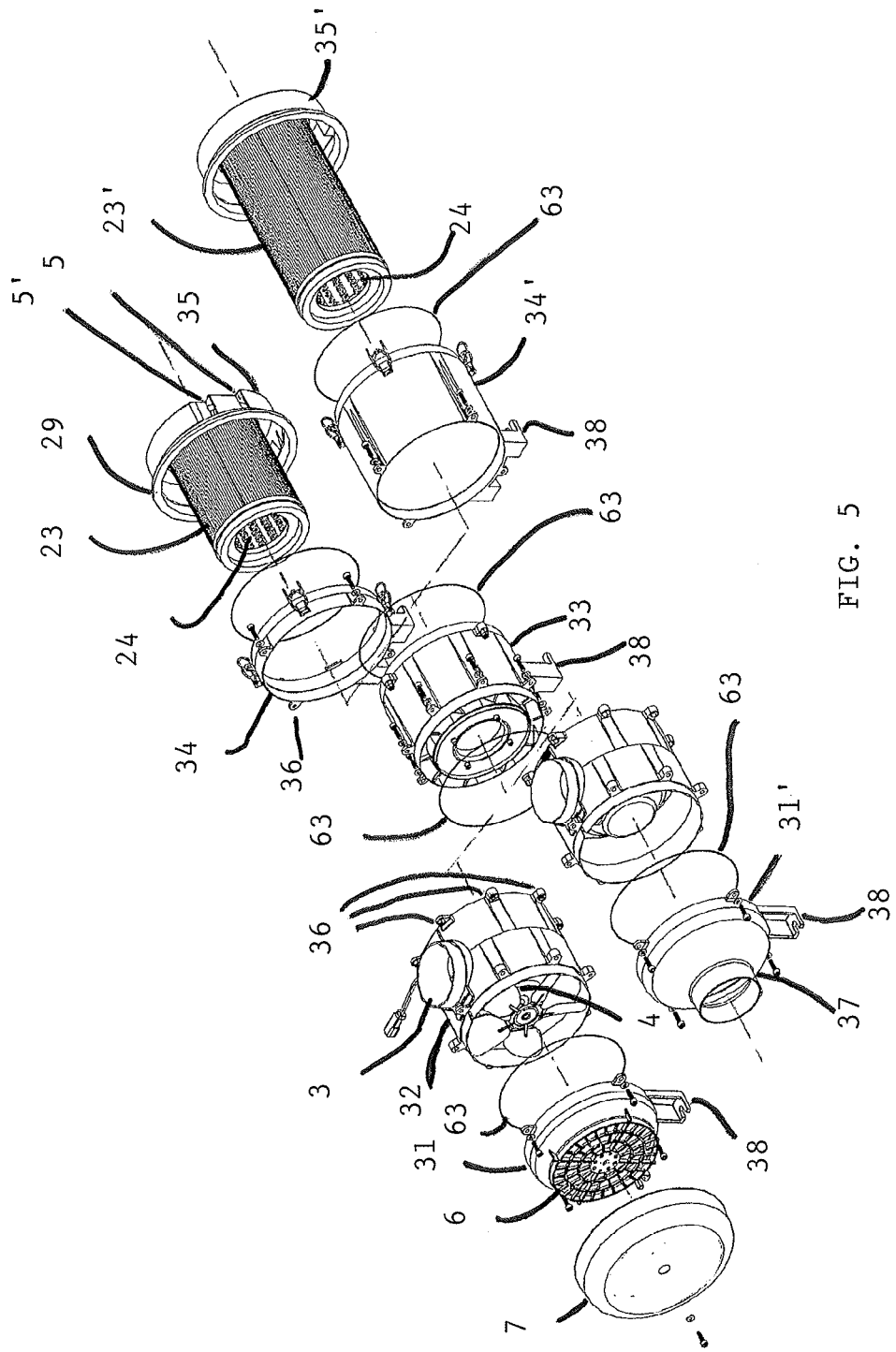
FIG. 5 is an exploded perspective view showing respective parts in disassembled relation of the air precleaners of FIGS. 3 and 4 including the rain cap seen in FIG. 2 and an alternative inlet configured for connection to an air supply conduit for air to be cleaned, and an alternative clean air outlet housing section wherein the motor-driven fan has been omitted in case a vacuum applied to the clean air outlet is used exclusively to draw debris laden air into the air precleaner.

The separator chamber section 33 of the housing attached to the downstream end/bottom of the outlet section 32 of the housing 11 provides a smooth transition of the rotating airflow into the separator chamber 19. Sealing gaskets 63, FIG. 5, are used between the various housing sections to seal the outer housing. The airborne debris moves along and is pressed firmly against the inside of the outer wall 20 of the chamber until it reaches the ejector ports 5 and 5' at the lower end of the separator chamber 19 where it is ejected back into the environment as noted above. The airflow that has been stripped of most of the debris, in the innermost orbits of the stratified rotating flow within the single stage separator chamber, flows through the air filter 23, within the air filter internal passage 24 to the clean air outlet 3 of the air precleaner and the downstream device, such as an internal combustion engine or ventilation system, connected to the outlet.

The plurality of housing sections, e.g. the inlet section 31, the outlet section 32, and the separator chamber sections 33, 34 and 35 are arranged sequentially along the axis A-A with the sealing gaskets 63 therebetween and releasably connected to one another end-to-end at a plurality of spaced circumferential locations by releasable threaded fasteners 30. Four circumferentially spaced spring clamps 28 releasably connect the separator chamber end section 35 to the lower end of the separator chamber section 34 of the housing. The lower ends of the spring clamps are releasably secured about a radially outwardly extending flange 29 at the upper end of the end section 35. By releasing the spring fasteners, the end section with filter 23 secured thereto can be rotated to change the direction of the ejection ports 5, 5' to any location on the periphery of the air precleaner. There is full 360° of freedom for customization of the air precleaner to a specific application. The spring clamps 28 are also released for replacing the assembly of the air filter and separator chamber end section, which constitutes a removable, disposable air filter cartridge. By including the ejector ports 5, 5' in the separator chamber end section 35 of the air filter cartridge, replacement of the filter restores the air precleaner to its full operating potential if the ejector ports had been clogged during the past filter cycle. The arrows B, B' in FIG. 6 depict the directions of the ejection of debris from the two ejection ports 5, 5' in the separator chamber end section 35 of the housing.

Figure 7:
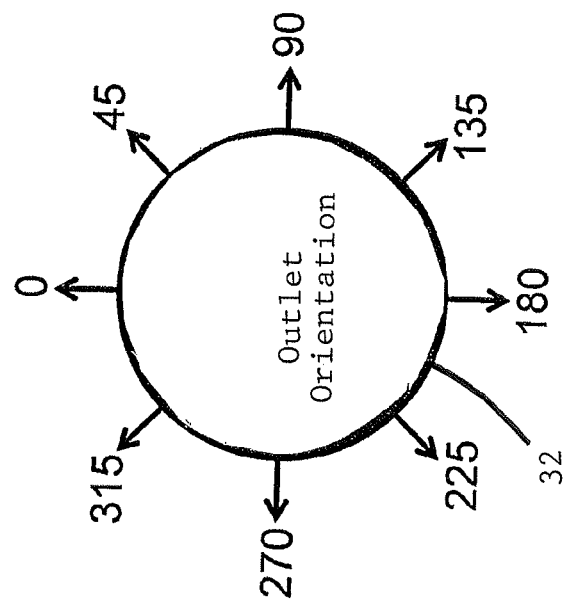
FIG. 7 is a schematic illustration of the eight possible outlet directions/radial positions of the clean air outlet about the longitudinally extending axis, A-A in FIG. 1, of the precleaner of the invention.

The connections between the separator chamber section 33 of the housing 11 and the outlet section 32 of the housing are formed at eight pairs of uniformly circumferentially spaced, opposing tabs 36 on the sections using threaded fasteners 30 connecting adjacent pairs of tabs. By removing the threaded fasteners, the outlet section can be rotated about the axis A-A and selectively located in any of eight possible locations in the air precleaner with 45° indexing provided by the tab locations. The multiple outlet configurations possible are shown schematically by the arrows in FIG. 7.

Figure 8:
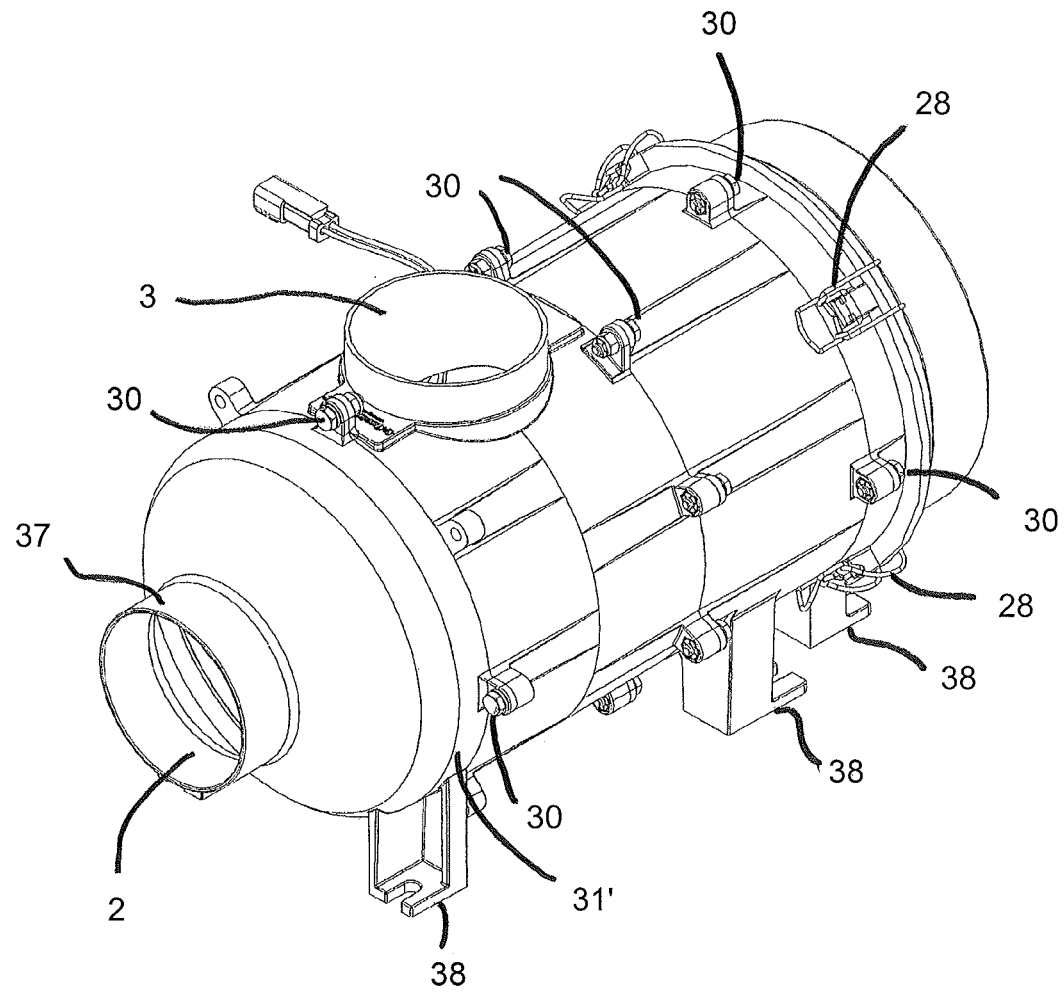
FIG. 8 is a perspective view of the air precleaner like FIG. 1, but with the inlet configured for connection to an air supply conduit for air to be cleaned as seen in FIG. 5.

The inlet section 31 of the housing 11 and the outlet section 32 are connected at four pairs of opposed tabs 36 uniformly spaced about the periphery of the sections and connected by releasable threaded fasteners 30. As noted above, the inlet section 31 in the embodiment of FIG. 1 can be replaced with an inlet section 31' shown in FIGS. 5 and 8 having a fitting 37 as a coupling for an air supply conduit as where the air precleaner is positioned below the hood of a vehicle.

The separator chamber sections 33 and 34/34' and inlet section 31/31' of the housing 11 are each formed with a pair of mounts 38 for use in mounting the air precleaner to a support or device in use. The mounts are formed integrally with their respective housing sections. Because the sections 33 and 34/34' and 31/31' are independently rotatable about axis A-A with respect to one another and the air precleaner, the mounts can be positioned to a selected circumferential location spaced every 45° about the periphery of the air precleaner without effecting/independent of the directions of the outlet and the ejector ports. The housing sections are formed of molded plastic in the disclosed embodiment but other materials could be used.

Figure 3:
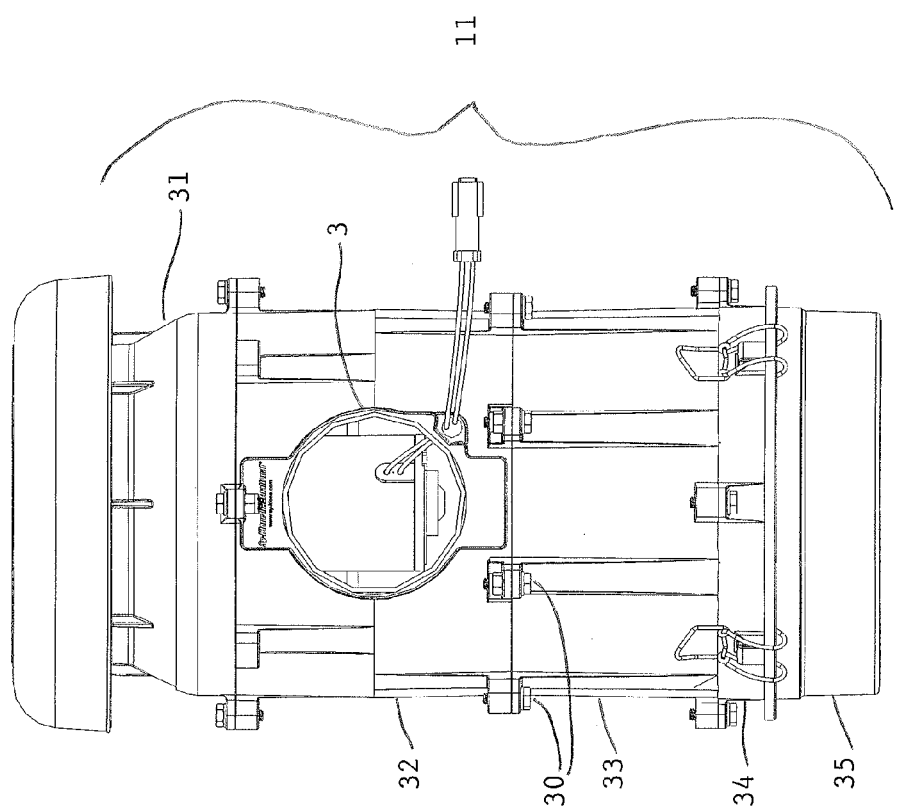
FIG. 3 is a side view of the air precleaner of FIG. 2, shown upstanding, as seen in a direction looking into the clean air outlet.
Figure 4:
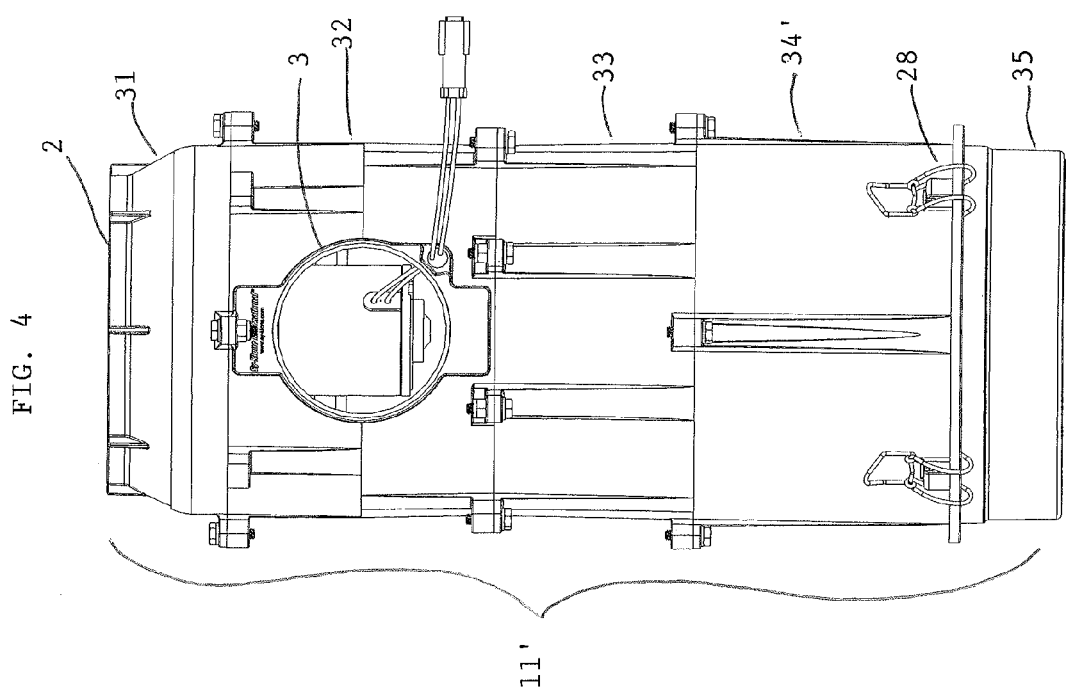
FIG. 4 is a side view like that of FIG. 3 wherein the air precleaner has been lengthened by substitution of a longer separator chamber section of the housing for the shorter one shown in FIG. 3 as a filter extender allowing the use of an extended life filter, the rain cap being omitted from the air precleaner as in FIG. 1.

According to a further feature of the invention, by forming the separator chamber of the housing with an upper section 33, as shown in FIG. 3, and a lower section 34 which is intermediate the upper section and the separator chamber end section 35, different size filters can be accommodated. That is, as shown in FIG. 4, the axial length of the lower section can be changed by replacing section 34 with longer section 34' for accommodating a longer filter in the precleaner. Likewise, the orifice/coupling member 25 connected to the airflow management structure against which the upper end of the filter is sealed can be changed to alter the airflow restriction/airflow rate of the air precleaner. Use of a fan blade 12 having a different blade pitch within the air precleaner also enables with only a few changes in the air precleaner customization of the airflow rate of the air precleaner depending upon the application.

The motor of the motor-driven fan 4 and the control thereof in the air precleaner can be in accordance with the commonly owned U.S. patent application Ser. No. 11/877,036 referred to above. The wiring 39 for the motor extends through a resilient wire plug 40 mounted in an opening in the outlet section 32. The centrifugal separation of heaver-than-air particulate debris within the air precleaner is described in detail in the referenced application. However, the air precleaner of the invention is more compact through the use of a flow path for air passing through the separator chamber which is retroflexed en route to the outlet located intermediate the ends of the air precleaner, while at the same time permitting use of different filters within the air precleaner, and because of versatility of the air precleaner, permitting a single air precleaner to be used in different applications requiring different configurations for the inlet, the outlet, the ejector ports as well as different arrangements for supporting/mounting the air precleaner. Servicing the air precleaner is also facilitated. In the example embodiment the housing 11 in FIG. 1 has a length of 16.8 inches/42.7 cm (without rain cap—18.9 inches/48.0 cm with rain cap) and the drawings are scaled, but other sizes could be made.

Figure 13:
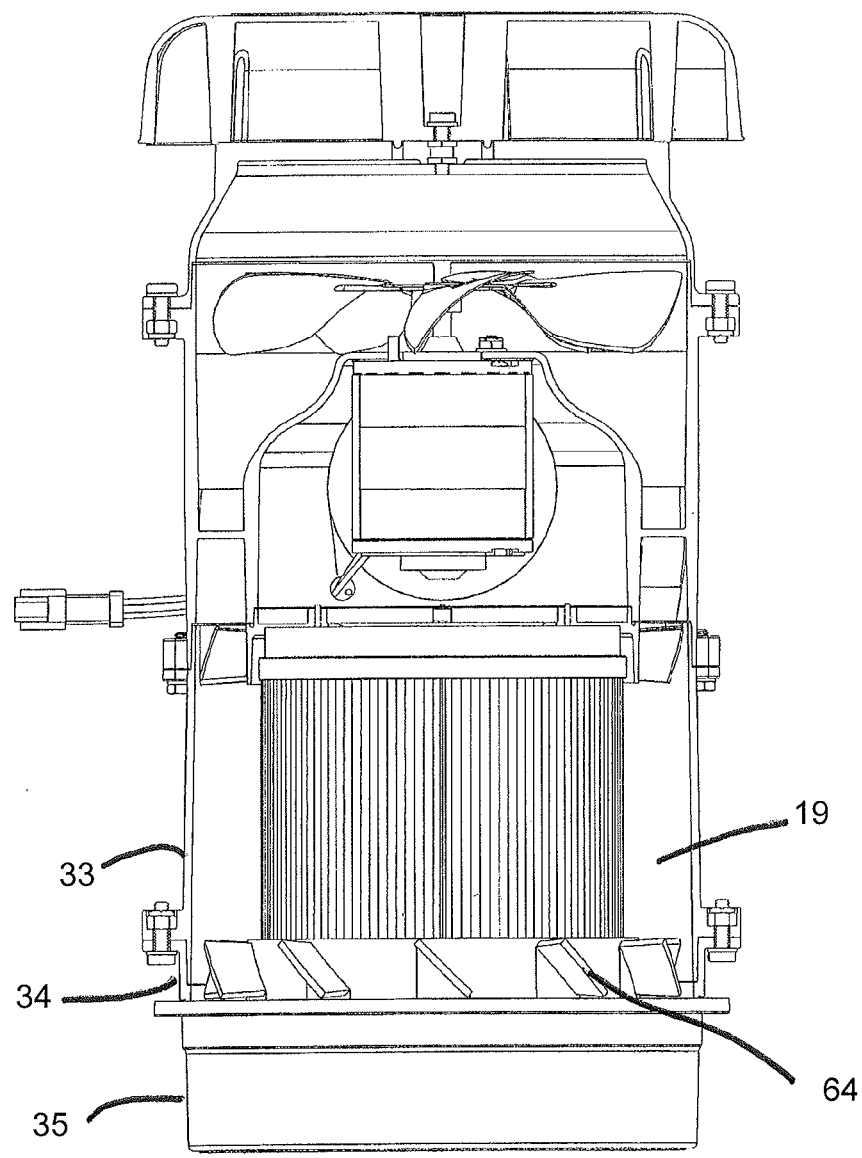
FIG. 13 is a side view of the air precleaner, partially cut away, like FIG. 12, but showing the use of a vaned ring in the separator chamber toward the ejector port end of the separator chamber to enhance rotational, centrifugal air flow in the chamber about the axis A-A.

While only a single embodiment, with several variations, has been shown and described in accordance with the present invention, it is understood that the same is not limited thereto, but is susceptible to numerous changes and modifications as known to the skilled artisan. For example, the air precleaner of the invention need not include a motor-driven fan but could be of the type wherein a vacuum is provided to the precleaner at its outlet from the inlet of the downstream device being supplied with clean air such as an internal combustion engine. In addition, a vaned ring 64, FIG. 13, secured to the inner wall of separator chamber housing section 34, could be provided at the downstream portion of the separator chamber 19, before end section 35 and the ejector ports. A plurality of circumferentially spaced, angled stationary vanes on the vane ring are airflow management structure to maintain the rotational flow of debris laden air about the axis A-A and the air filter in the separator chamber up to the ejector ports to facilitate centrifugal separation of debris and avoid laminar flow, particularly at high airflow rates and with longer filters. Further, the air precleaner need not include a filter within the centrifugal separator chamber. A filter, if used, could be located downstream of the air precleaner outlet. The advantages of compactness and versatility of the invention would be retained in such variations. Therefore, the invention is not limited to the details shown and described therein, but covers all such changes and modifications as are encompassed by the scope of the appended claims.

The invention claimed is:

1. An air cleaning method comprising:
   drawing heavier-than-air particulate debris laden air into an inlet at a first axial end of a powered air precleaner comprising a motor-driven fan with a fan blade located in a flow path in the air precleaner, the air precleaner extending along a longitudinal axis between the first axial end and a second axial end,
   flowing the particulate debris laden air along the flow path in the air precleaner from the inlet to the second axial end where the flow path is retroflexed en route to an outlet intermediate the axial ends,
   rotating the flow of the debris laden air about an axis in the air precleaner to form a stratified rotating flow with heaviest particles in outermost orbits of the stratified rotating flow,
   ejecting particulate debris laden air from the outermost orbits of the stratified rotating flow through at least one ejector port of the air precleaner,
   filtering air from innermost orbits of the stratified rotating flow through an air filter of the air precleaner extending along said axis within the rotating flow,
   flowing the filtered air through an internal passage in the air filter which forms a portion of the retroflexed flow path toward the outlet of the air precleaner,
   including utilizing a removable, disposable air filter cartridge in the air precleaner, wherein the air filter for said filtering and an end section of the air precleaner forming the second axial end thereof closing one end of the internal passage of the air filter and including the at least one ejector port for said ejecting are integral parts of the removable, disposable air filter cartridge of the air precleaner.

2. The air cleaning method of claim 1, including flowing the filtered air en route to the outlet past a motor of the motor-driven fan of the air precleaner.

* * * * *